Figure 5A:

Jan. 27, 1959            O. BAIER            2,870,578
MECHANISM FOR MACHINING TROCHOIDAL ROTORS AND COUNTER-ROTORS
Filed March 18, 1957            15 Sheets-Sheet 1
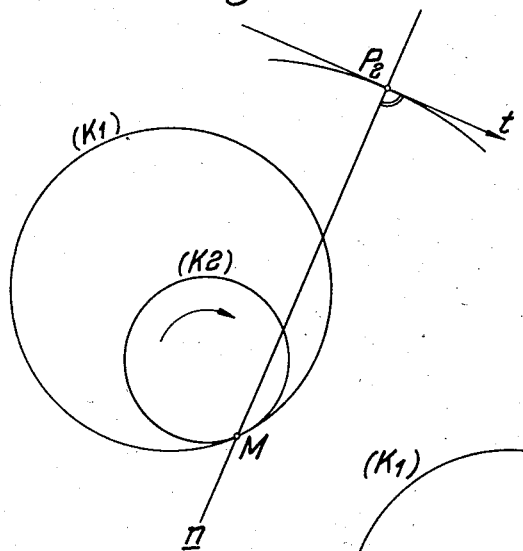
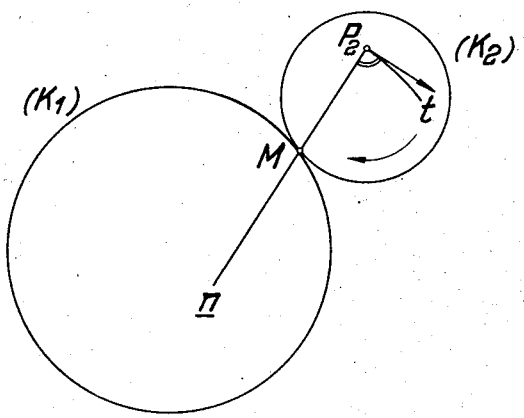
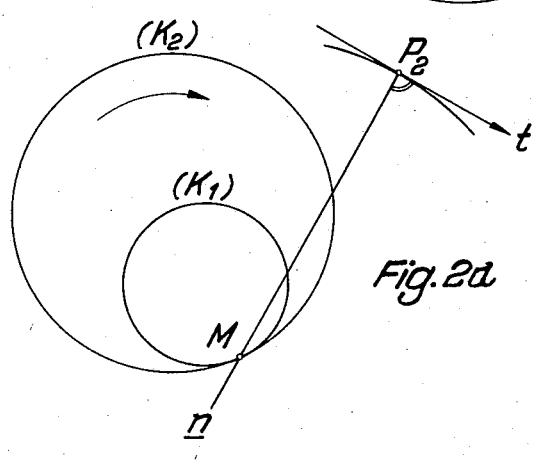
Inventor:
O. Baier

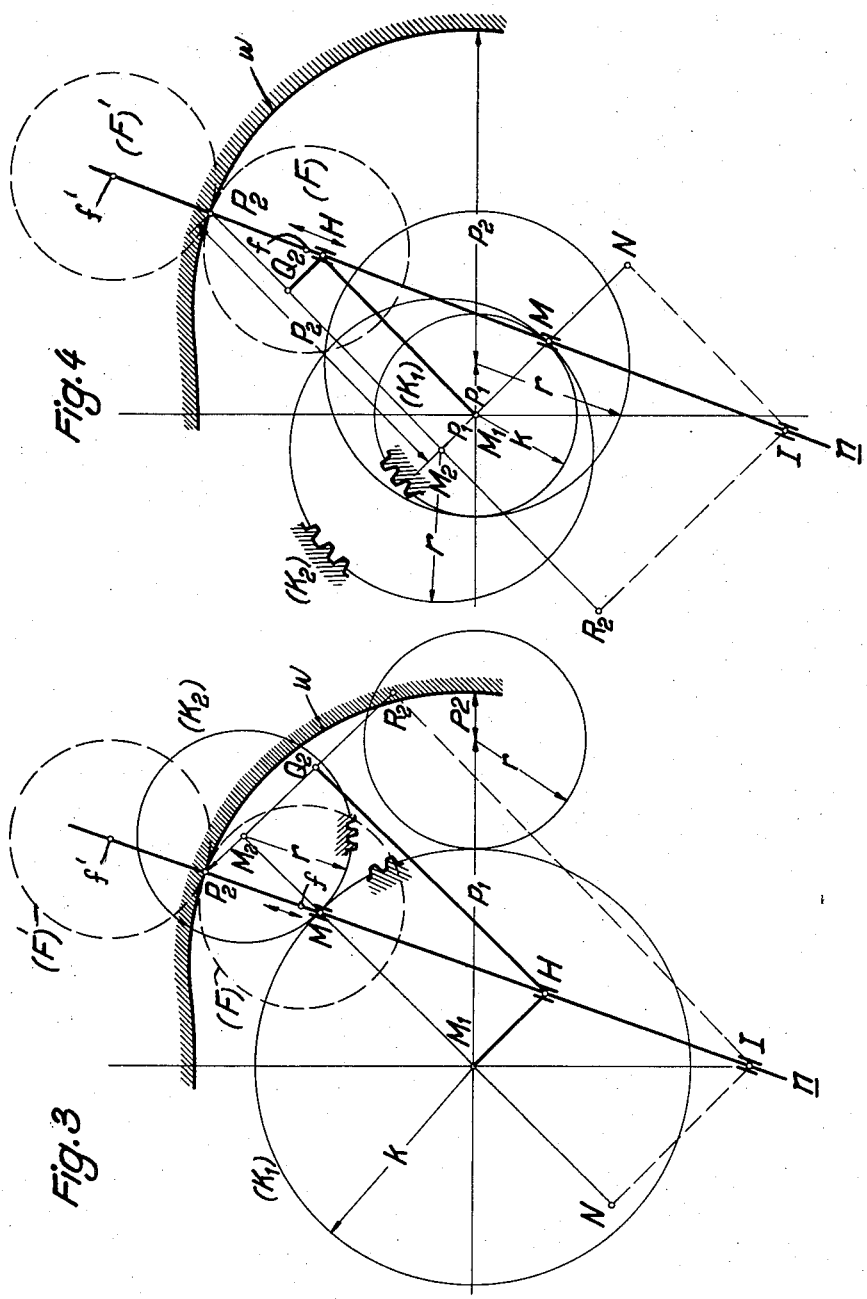

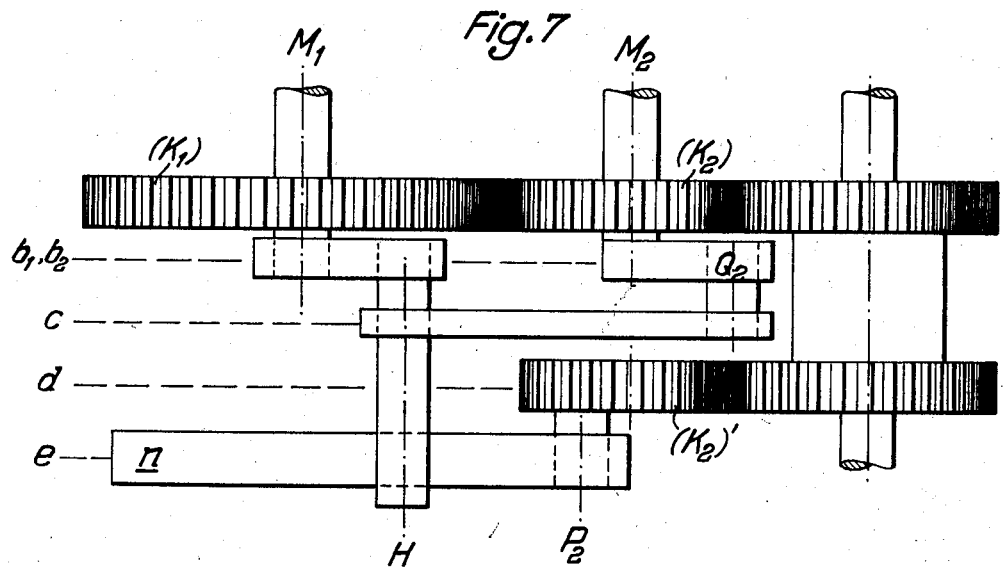
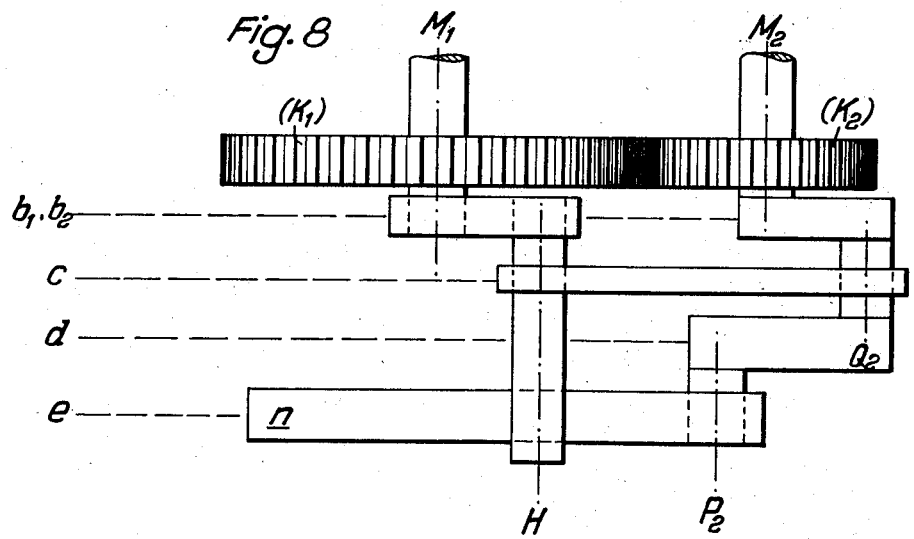

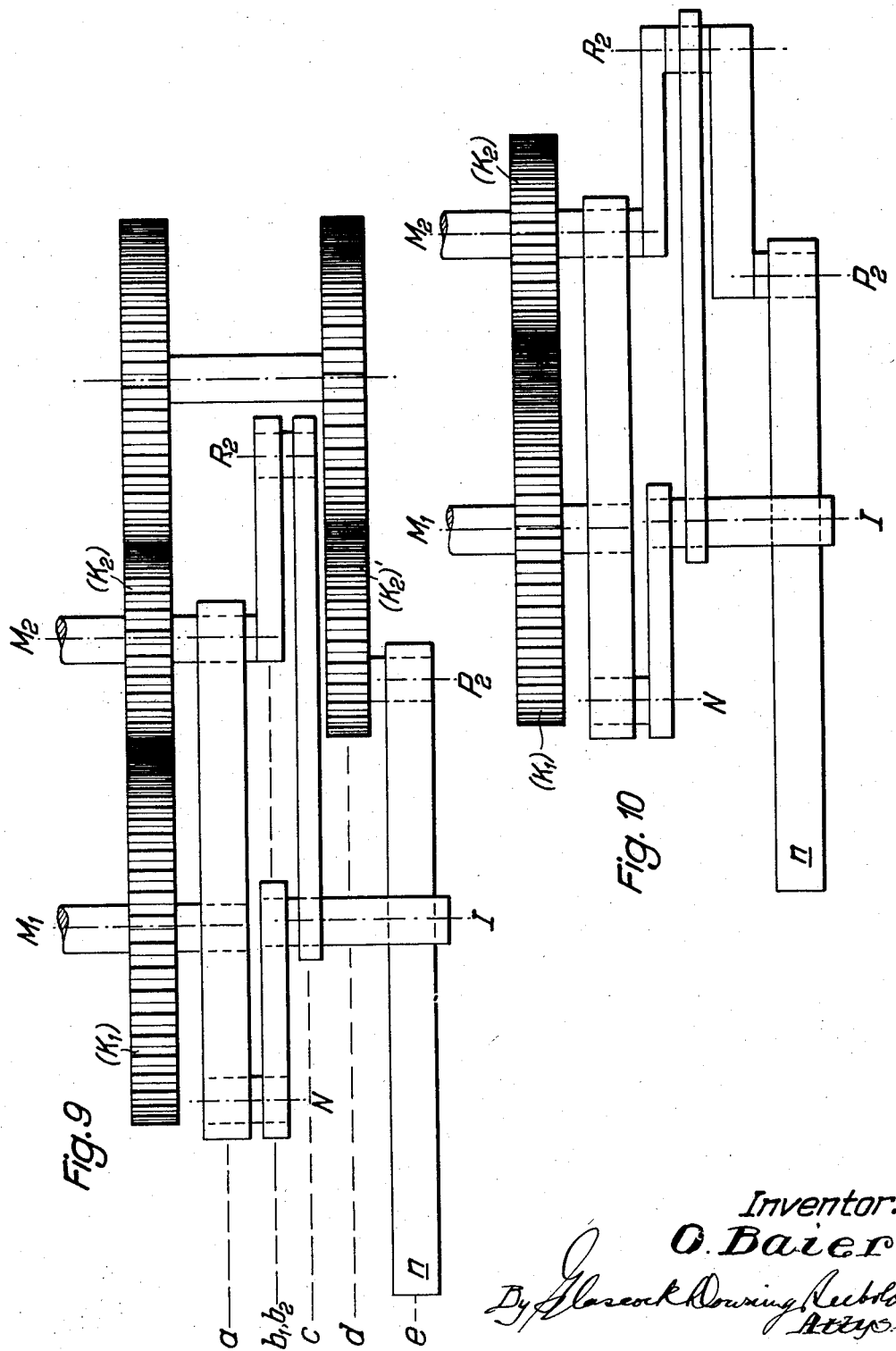

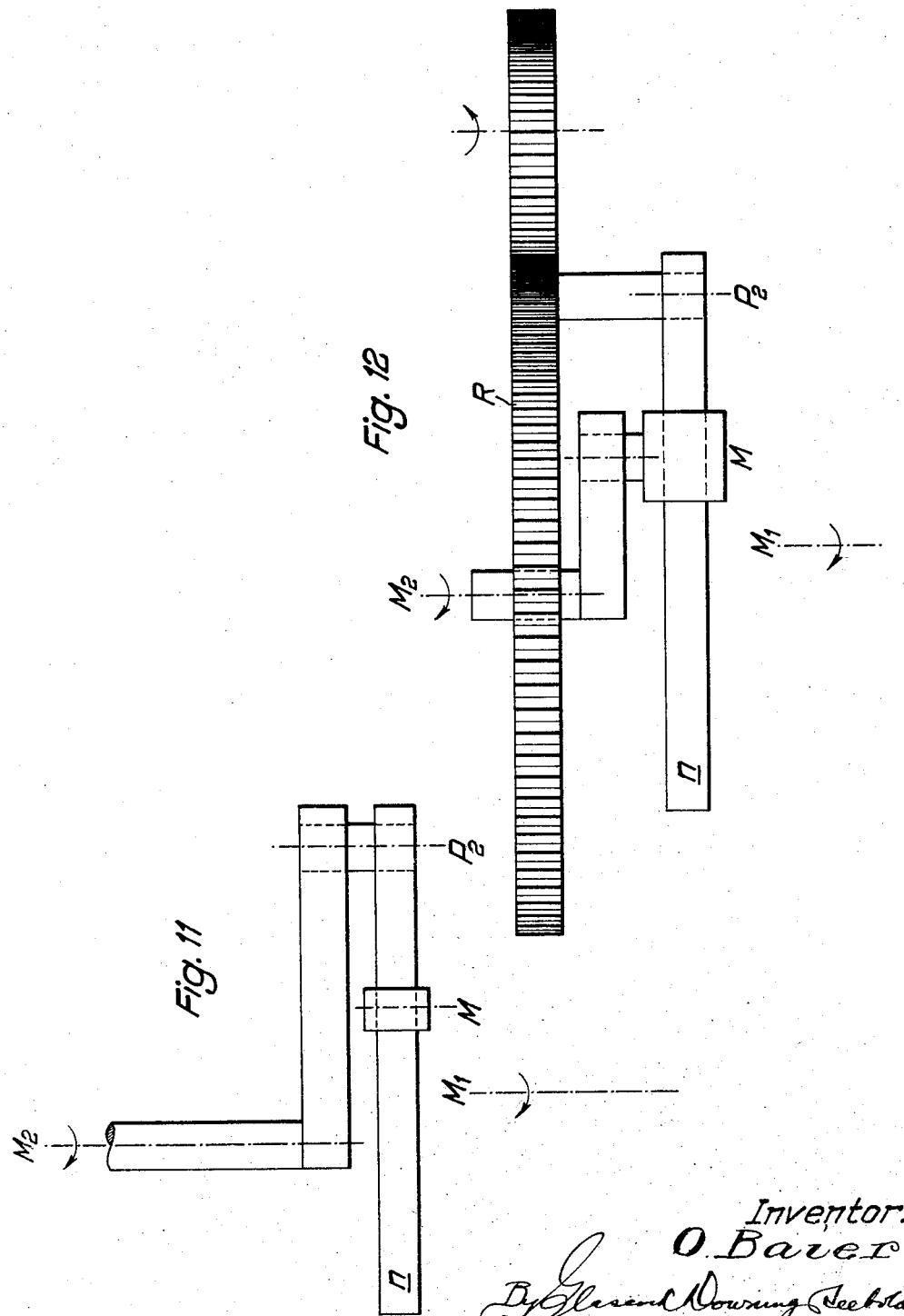

Jan. 27, 1959     O. BAIER     2,870,578
MECHANISM FOR MACHINING TROCHOIDAL ROTORS AND COUNTER-ROTORS
Filed March 18, 1957     15 Sheets-Sheet 8
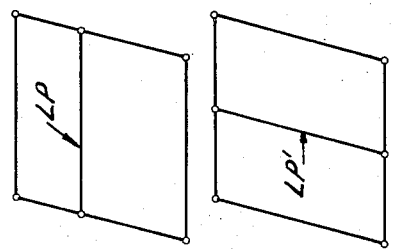
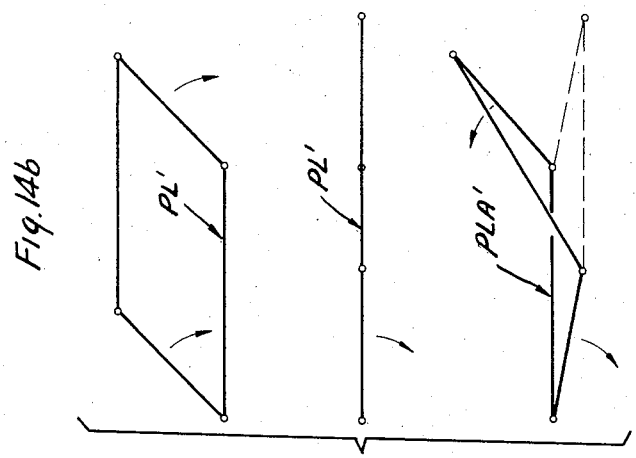
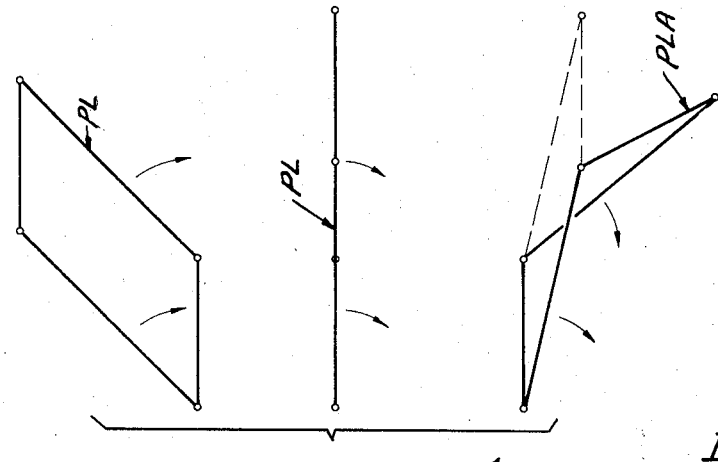
Inventor:
O. Baier

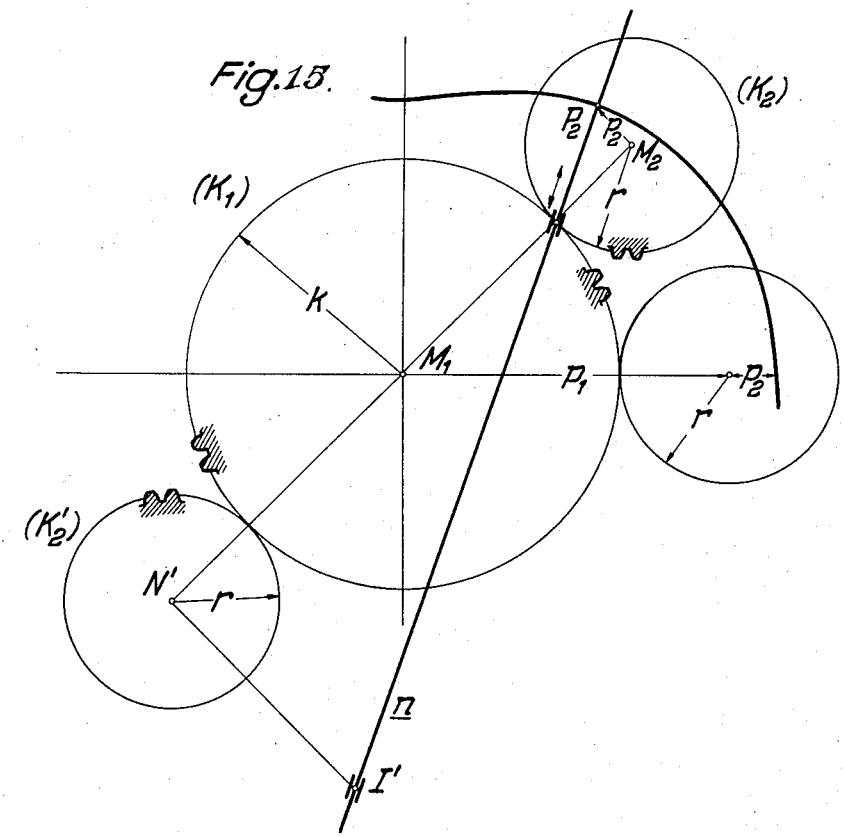

Inventor
O. Baier

Jan. 27, 1959     O. BAIER     2,870,578
MECHANISM FOR MACHINING TROCHOIDAL ROTORS AND COUNTER-ROTORS
Filed March 18, 1957     15 Sheets-Sheet 11
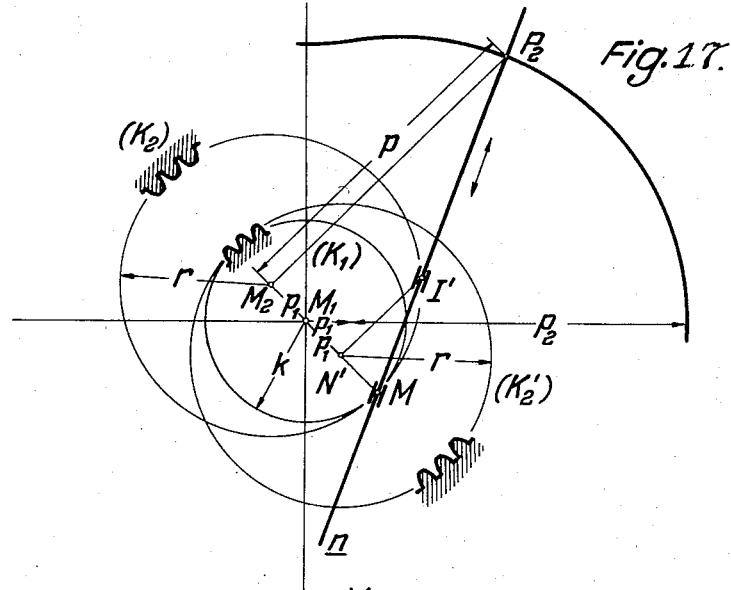
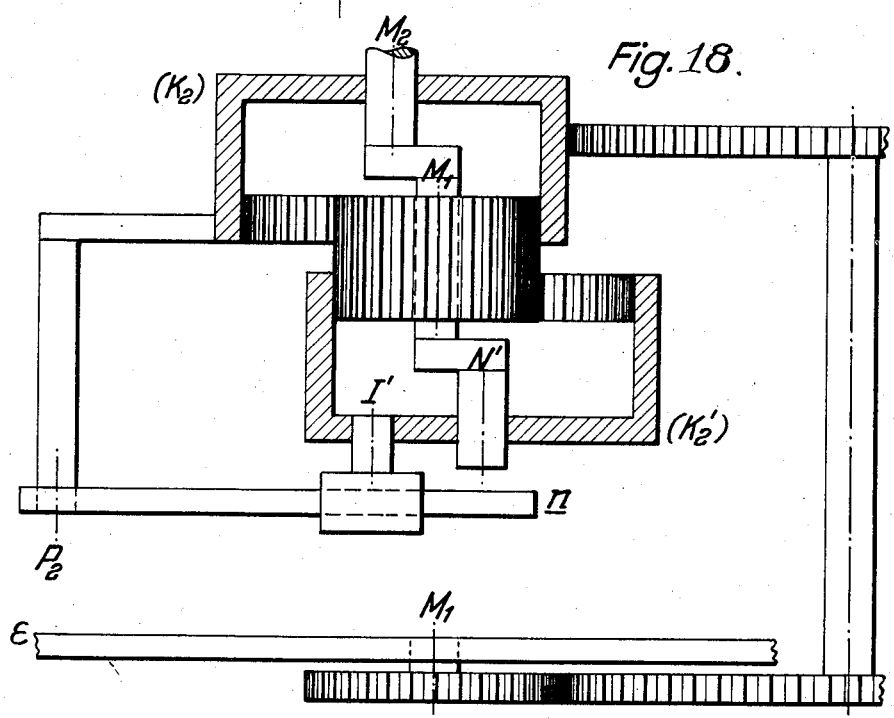
Inventor:
O. Baier Jan. 27, 1959 O. BAIER 2,870,578
MECHANISM FOR MACHINING TROCHOIDAL ROTORS AND COUNTER-ROTORS
Filed March 18, 1957 15 Sheets-Sheet 12
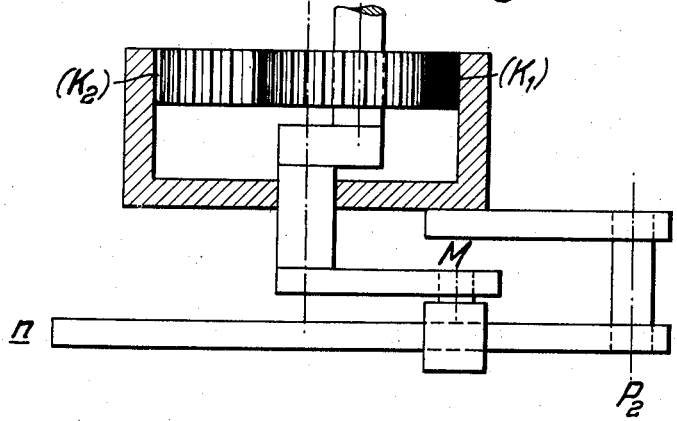
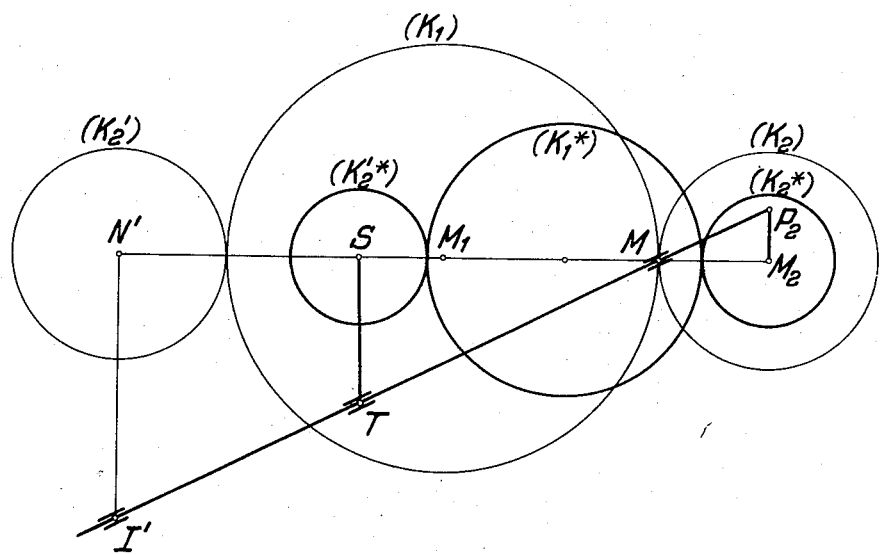
Inventor:
O. Baier Jan. 27, 1959            O. BAIER            2,870,578
MECHANISM FOR MACHINING TROCHOIDAL ROTORS AND COUNTER-ROTORS
Filed March 18, 1957            15 Sheets-Sheet 15

Inventor
O. Baier

United States Patent Office 2,870,578
Patented Jan. 27, 1959

2,870,578

MECHANISM FOR MACHINING TROCHOIDAL ROTORS AND COUNTER-ROTORS

Othmar Baier, Stuttgart, Germany, assignor to NSU Werke Aktiengesellschaft, Neckarsulm (Wurttemberg), and Felix Wankel, Lindau am Bodensee, Germany Application March 18, 1957, Serial No. 646,842

16 Claims. (Cl. 51—90)

This invention relates to apparatus for machining rotors of epi- and hypotrochoidal cross sections. Such rotors are required for certain types of rotary piston engines. Various forms of the trochoidal curve can be employed according to the nature of the engine in question which may be a compressor, a pump, a prime mover, etc. Single to five-lobed trochoidal curves are principally relevant. The trochoidal rotor may be either an inner or an outer rotating member. The outer member is the faster revolving rotor of the engine, the inner member revolving more slowly. The inner member is in continuous abutment with the outer member at several discrete points of contact and its shape is determined by the enveloping curve defined by the relative motion of the outer member around the internal member.

To satisfy the high standards of precision that are required the flanks of the rotors are not produced by a process of copy-machining, but by direct methods of generation. The provision of special patterns is not therefore required, and the difficulties that arise as a result of inadequate precision in the transmission in pattern work are thus avoided.

As will be later explained trochoids and their outer and inner parallel curves can be directly generated by positive mechanical means, the machining tool being located in the line of the normal to the trace of the trochoid. This permits wear of the tools in the course of the cutting or grinding procedure to be compensated by re-adjustment of the tool in relation to the workpiece and along the line of the normal, and it also permits the generation of any inner and outer parallel curves to the trochoid represented by either rotor by adjusting the tools at the appropriate point on the normal. The normal could be represented by a link rod fulcrumed at the generating point of the trochoid and rotatably and slidably held at the point of osculation of the two rolling circles. However, for the generation of trochoidal curves that are to be suitable for rotary piston engines, this method of determining the position of the normal is not sufficiently precise. In the course of the rolling motion the two points used for fixing the normal—i. e. the generating point and the travelling point of osculation of the two circles are so close together that in practice the accuracy with which they fix the position of the normal is not sufficient to ensure precise generation of the trochoidal curve.

However, if it is not desired to relinquish the special advantage inherent in directly generating the curve, the lack of precision in the positional fix of the normal must be avoided. Furthermore, the exigencies of production require that the tools must be guided in such a way that the mechanism is prevented from locking and that both an epi- as well as a hypotrochoidal rotor can be produced in continuous motion.

The present invention contemplates a mechanism for machining trochoidal rotors, i. e. both the outer and the associated inner rotor as well as parallel curves thereto, in which (1) The tool will be guided with absolute precision in every phase of the operation,
(2) The tool guiding mechanism will operate, without locking, in continuous motion.

The invention will be more particularly described with reference to the accompanying drawings which illustrate the principle of the invention and various embodiments thereof.

Figure 5:
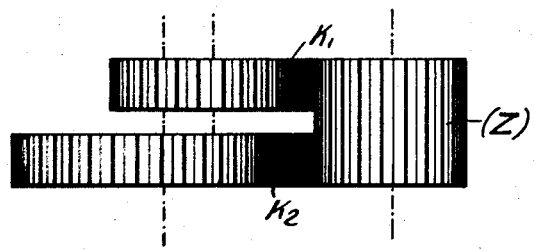
Figure 6:
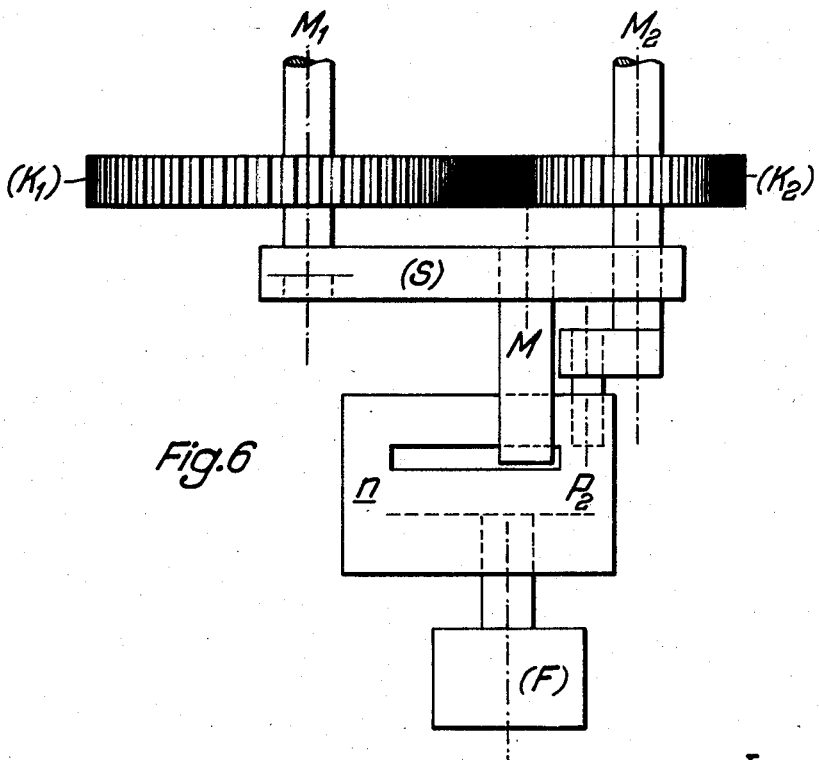
Figure 13:
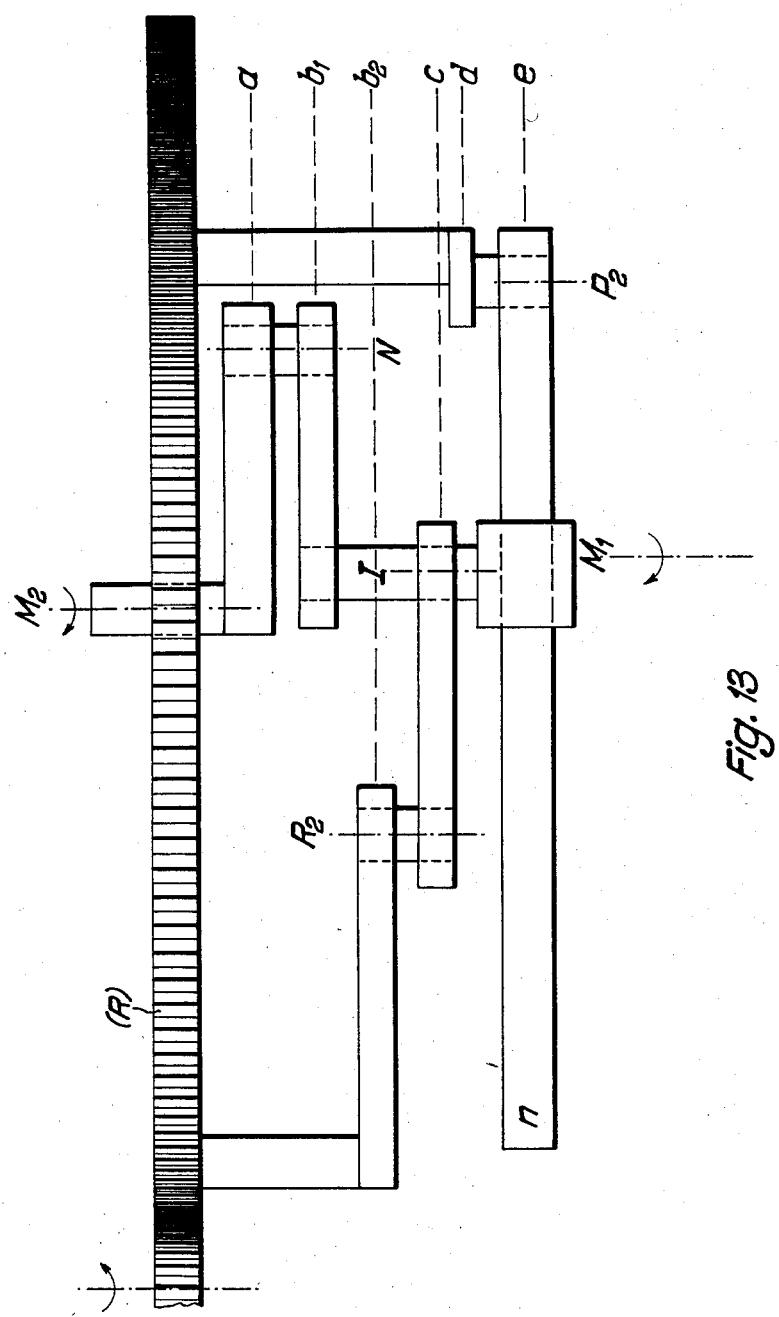

Figure 1 is a diagrammatic view illustrating a relationship for generating a trochoid in which the generating point is on a line that is normal to the trochoid and rigidly connected to a wheel or circular element mounted to roll within a fixed wheel or circular element, and in contact therewith, Figure 2 is a similar diagrammatic view of a modified relation in which the generating point is along a line that is normal to the trochoid and rigidly connected with a wheel or circular element mounted to roll in contact with the exterior of a fixed wheel or circular element, Figure 2a is a similar diagrammatic view of a relationship in which the rotary wheel or circular element is of greater diameter than the fixed wheel or circular element and the interior of the rotary wheel or element rolls in contact with the exterior of the fixed wheel or circular element, Figure 3 is a diagrammatic view illustrating a mechanism for generating a two-lobed epitrochoid and in which the wheels or circular elements are gears having external teeth and with a parallel linkage mechanism guiding the rod or bar constituting the normal, Figure 4 is a view similar to Figure 3, but illustrating an arrangement in which the rolling circular element is a gear with internal teeth, Figure 5 is a fragmentary cross-sectional view of the arrangement shown in Figure 4, Figure 5a is a fragmentary diagrammatic view, partly in elevation and partly in section in which the gear teeth of the circular element are external, and an intermediate spur gear is incorporated in the relationship, Figure 6 is a diagrammatic elevational view illustrating the mechanism of Figure 3, in which the slidable connection of the rod that constitutes the normal and the point or element perpendicular to the normal is at the meshing point between the rotary circular element and the fixed circular element, Figure 7 is a view similar to Figure 6, based on the general linkage relationship shown in Figure 3, but including an altered location of the slidable connection with the link or rod constituting the normal, and further including additional spur gears to transmit motion, Figure 8 is a view similar to Figure 7, but illustrating a modified relationship including a crankshaft for transmitting motion, Figure 9 is a view similar to Figure 7, but illustrating an altered relationship of the slidable connection with the element of the linkage constituting the normal, but including a spur gearing relationship for transmitting motion, Figure 10 is a view similar to Figure 9 in that the relationship of the slidable connection is the same, but a crankshaft is substituted for the spur gear relationship, Figures 11, 12 and 13 are diagrammatic fragmentary elevational views based on the Figure 4 relationship including slidable connections in the linkage to insure the continuous tool motion.

Figures 14a and 14b diagrammatically illustrate the indeterminacy of parallel four-bar linkages.

Figures 14c and 14d diagrammatically illustrate similar linkages including an additional parallel link by which the indeterminacy is obviated.

Figure 16A:
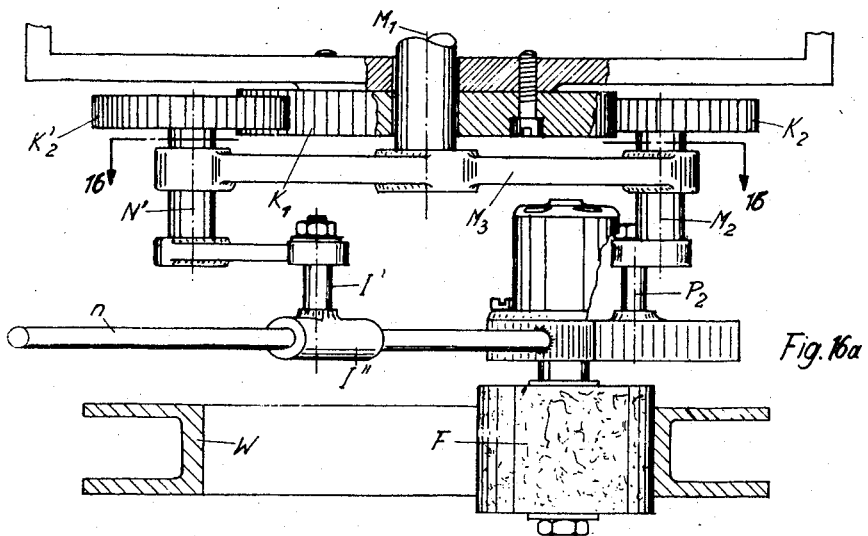
Figure 16:
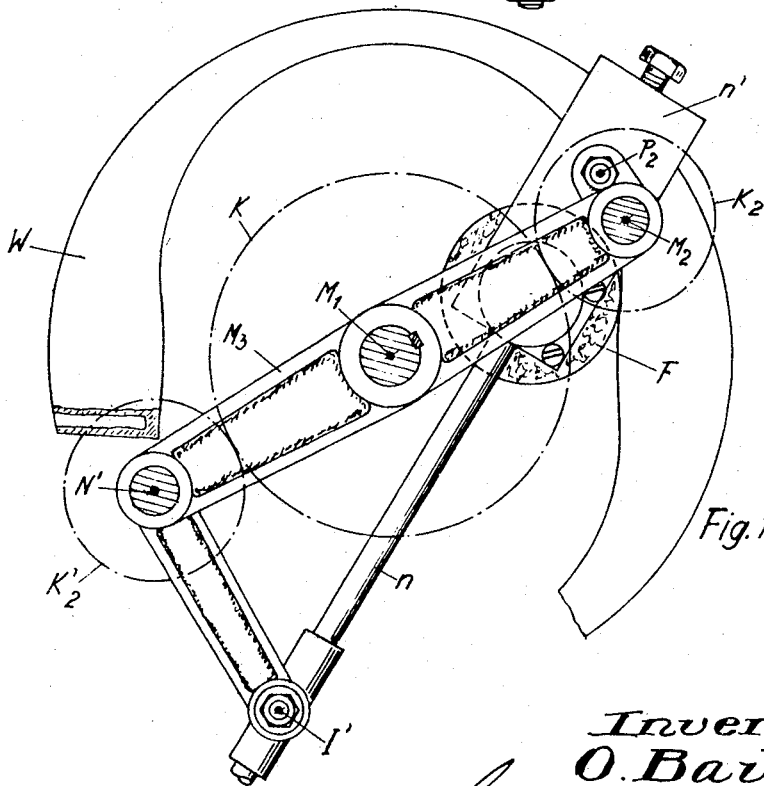
Figure 21:
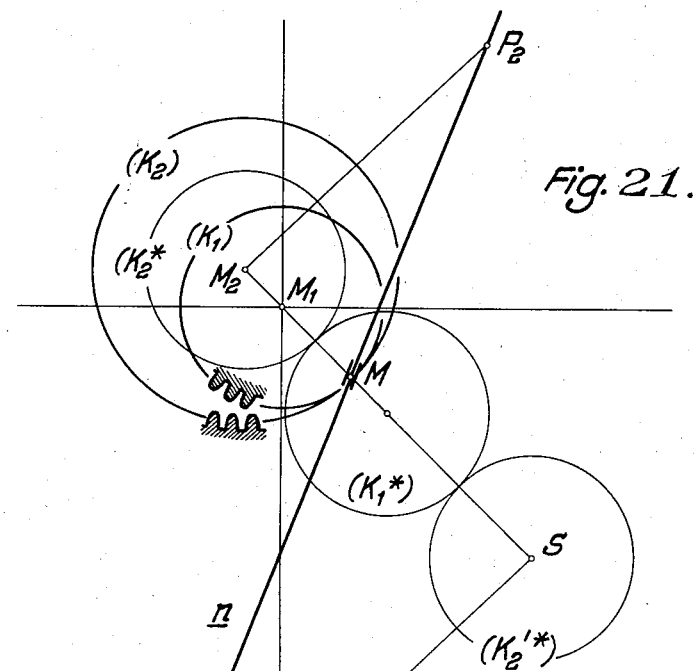
Figure 22:
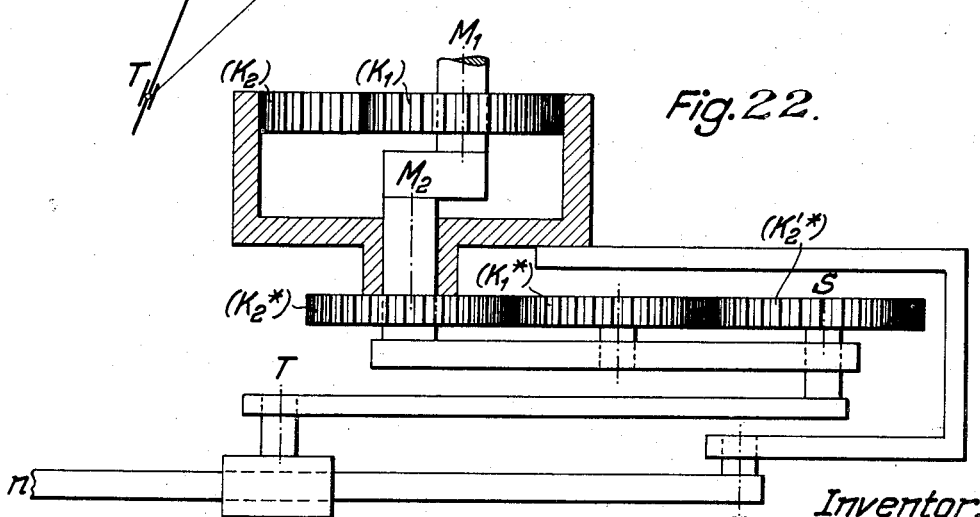
Figure 23:
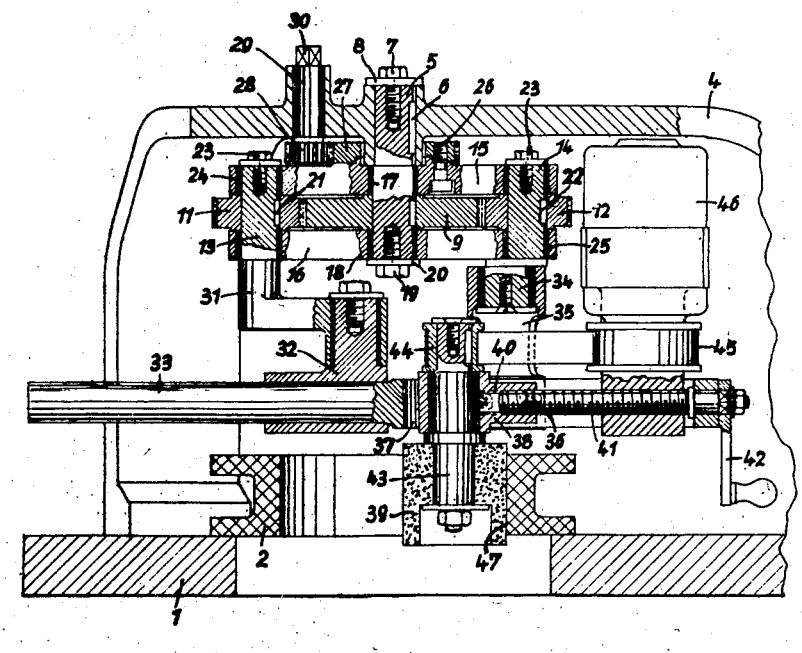
Figure 24:
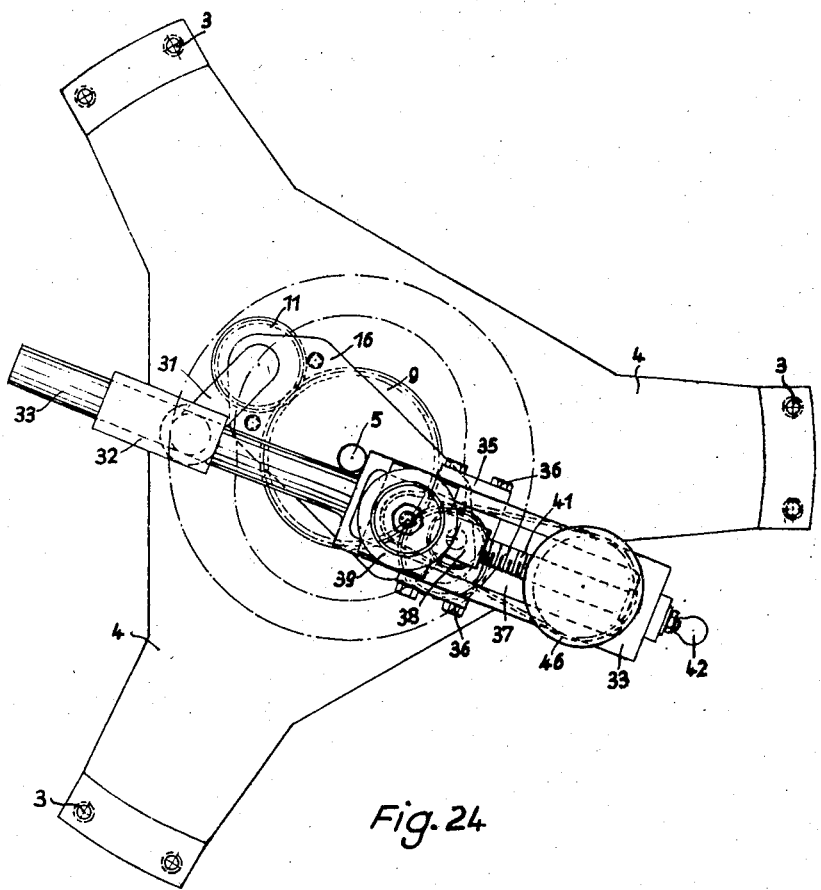

Figure 15 is a diagrammatic view illustrating a relationship for guiding the trochoid normal by a determinate motion, Figure 16 is a fragmentary view in section taken along line 16—16 of Figure 16a, Figure 16a is a view partly in vertical section and partly in elevation, and illustrating a practical embodiment of the relationship indicated in principle in Figures 15 and 16, Figures 17 and 18 are respective diagrammatic plan and side elevational views illustrating the application of determinate motions to a trochoid generating system in which rolling ring gears are in contact with a spur gear rotating about a stationary axis, Figure 19 is a view similar to Figure 12, but illustrating a modified relationship, Figure 20 is a diagrammatic plan view illustrating another modification for guiding the normal, Figures 21 and 22 are respectively diagrammatic plan and elevational views of a relationship similar to Figure 17, and including internal gears, Figure 23 is a fragmentary view partly in vertical section and partly in elevation illustrating another practical embodiment of a machine corresponding to the diagrammatic relationships shown in Figures 15 and 16, and, Figure 24 is a plan view of the structure of Figure 23, as viewed from the bottom, with the base plate removed.

Mechanisms contrived in accordance with the present invention are determined by the following general considerations which are conveniently discussed with reference to Figs. 1 to 13.

(1) *Generation of a trochoid (cf. Figs. 1, 2 and 2a).*— A trochoid can be regarded as being the curve traced by a point $P_2$ rigidly connected with a circle ($K_2$) that rolls without slipping on the inside (Fig. 1) or outside (Figs. 2 and 2a) of a fixed circle ($K_1$). To generate continuous non-intersecting curves the circumference of the larger circle must be several times that of the smaller circle (Figs. 1, 2) or, alternatively, the peripheries of the two circles must be in the proportions of consecutive integers (Figs. 1, 2a).

(2) *Method of guiding the tool (cf. Figs. 1, 2 and 2a).*—Whilst point $P_2$ moves exactly along the trace of the trochoid, the tool axis must move along an inner or outer parallel curve thereto to bring the cutting edge of the tool into alignment with the trochoidal curve, the tool radius being less than or equal to the minimum radius of curvature towards the tool of the generated curve and, if the tool axis moves on an inner parallel curve, less than the radius of the smallest of all the circles the trochoid envelops. Moreover, the tool axis must coincide with the normal to the trochoidal trace. The position of the normal is fixed by the tracing point $P_2$ and the momentray center of motion M. The momentary center of motion is the osculating or meshing point between the rolling and the fixed circle.

Hence, in Figs. 1, 2 and 2a the line connecting $P_2$ with M is the normal $n$ of the trochoid.

(3) *Diagrammatic representation of the mechanism.*— The two alternative possibilities of generating a given trochoid by the trace of a point $P_2$ rigidly connected with a moving circle ($K_2$) (radius $r$) which rolls on a fixed circle ($K_1$) are illustrated in Figs. 3 and 4 with reference to the exemplary generation of a two-lobed epitrochoid. Point M is located on the line connecting the two centers $M_1$ and $M_2$ of the two circles ($K_1$) and ($K_2$) and internally or externally divides the distance $M_1M_2$ in ratio with the lengths of the radii of the two circles. The distance of M from $M_1$ and $M_2$ is therefore fixed. The momentary position of the normal $n$ can be established by permitting the connecting line $P_2M$ to slide through a slip joint, or similar slidable connection pivotally mounted on the arm $M_1M_2$ with its fulcrum at M.

If the rotary piston engine is required to have a high compression ratio point, $P_2$ (cf. Fig. 3) must be situated close to the periphery of circle ($K_2$). The minimum distance $P_2M$ is $r-p_2$. In the neighbourhood of this minimum distance the determination of the position of the normal $n$ by points $P_2$ and M is insufficiently precise. Even when the distance between $P_2$ and M is a maximum the precision with which $n$ will be guided cannot be considered as good.

The following mechanism solves the problem of guiding the normal $n$ and the tool with adequate precision in a convenient and simple way:

The slip joint, sleeve or similar slidable connection is located at H (cf. Fig. 3) instead of at M. H is the elbow joint in a parallel linkage of which the arm $M_1H$ fulcrumed at $M_1$ has the length $np_2$ (in the illustrated example $n=2$; $k:r=2:1$; and $p_1=k+r$). The length of the other arm $HQ_2$ is equal to $p_1$ and the point $Q_2$ which is rigidly connected with ($K_2$), is located on the diameter containing $P_2M_2$ of circle ($K_2$) at a distance $M_2Q_2$ from $M_2$ which is likewise equal to $np_2$ (again $n=2$).

*Proof.*—The two triangles $MM_2P_2$ and $HQ_2P_2$ are at all times similar triangles and they are also similarly orientated since $MM_2$ is always parallel with $HQ_2$. Hence $$MM_2:M_2P_2=p_1:(n+1)p_2=HQ_2:Q_2P_2$$

In other words, H is located on the normal $n$ as required. As will be immediately evident from Fig. 3, the parallel linkage may be enlarged by locating the knuckle joints of the parallelogram at N on the produced line $M_1M_2$ and at $R_2$ on the produced line $P_2Q_2$ and by locating the fulcrumed slip joint, sleeve or similar slidable connection at I. The locus of one of the knuckle joints say N, may be arbitrarily chosen when the locus of the other point $R_2$ will be fixed.

If the trochoid is generated by a circle ($K_2$) (cf. Figs. 4 and 5) rolling on a fixed circlce ($K_1$) in such a way that ($K_2$) encloses ($K_1$), then the normal $n$ will likewise be determined by the line connecting the generating point $P_2$ and the momentary center M. M will again be located on the connecting line $$M_1M_2 \text{ and } M_1M:M_2M=k:r$$

It follows that $p_1=r-k$, $k:r$ being 2:3 in the illustrated example. The normal $n$ which is given by $P_2M$ slides in a slip joint, sleeve or similar slidable connection at M. Fig. 4 also shows a parallel linkage $M_2Q_2M_1H$ with a slip joint, sleeve or similar slidable connection at H which however, offers no advantage.

However, as in Fig. 3, the linkage may be enlarged as shown by $M_2R_2NI$, $R_2$ being a point located on the line $P_2M_2$ in the plane of ($K_2$) and rigidly connected with the latter. N is situated on the arm $M_2M_1$ and either $R_2$ or N can be freely chosen. The slip joint, sleeve or similar slidable connection must be located at I.

The internal gear teeth of ($K_2$) indicated in Fig. 4 may naturally be replaced by outside gear teeth if an intermediate spur gear wheel (Z) is provided as shown in Fig. 5a.

The axis of the cutting or grinding tool must be mounted on $n$. In Figs. 3 and 4 cutting or grinding tool F and its tool axis $f$ are shown. The trochoid is machined on workpiece $w$ by the tool in the position described. By displacing the tool axis inwards or outwards an inner or outer parallel curve will be generated. Analogously a trochoid or parallel curve may be produced as an outside contour by mounting the tool such as diagrammatically shown at F' on axis $f'$ to apply against the work from the outside.

(4) *Continuous tool motion.*—With the help of the direct guide means for guiding the normal at the momentary center and by means of a parallel linkage a suitable disposition of the necessary pivot pins, link rods and gear wheels will ensure that the tool will run through its cycle without locking.

To facilitate an understanding of the following description a motion based on Fig. 3 in which the slip joint, sleeve or similar slidable connection is located at M is first illustrated in Fig. 6. The mechanism is shown in that position in which the distance between $P_2$ and $M_1$ is a minimum. The gear wheels are indicated by their pitch circles. The movement of $P_2$ is generated by an arm $M_2P_2$ firmly secured to a shaft $M_2$ which passes rotatably through the wheel arm (S). The location of shaft $M_1$ is fixed. The wheel arm (S) thus represents a crank which is integral with ($K_1$) and revolves about $M_1$ together with ($K_1$). Point $P_2$ will then trace a trochoid in a plane normal to $M_1$, in other words the tool (F) will machine a trochoidal surface or a surface parallel thereto on a stationary blank. Fig. 6 clearly shows the inadequacy of the manner in which the block $n$ representing the normal is guided.

On the other hand, if ($K_1$) and ($K_2$) are allowed to revolve about fixed axes $M_1$ and $M_2$ in such a way that their peripheral speeds at the likewise fixed point M are equal so that they will roll on each other's peripheries without slippage—effected in Fig. 6 by ($K_1$) and ($K_2$) being provided with mating teeth—then the wheel arm (S) will likewise remain stationary. As indicated in Fig. 6 shaft $M_1$ is free to revolve in wheel arm (S). Point $P_2$ will then trace a trochoid in the plane of ($K_1$) if the latter revolves about point $M_1$ at the same speed as ($K_1$). This means that the blank must revolve about $M_1$ at the same angular speed as ($K_1$). The following description will be based upon the assumption that this is always the case. If it is desired that the blank should remain stationary, then shaft $M_2$ must be turned on $M_1$ by means of a crank arm (S).

The arrangement exemplified in Fig. 3 leads to a form of construction as shown in Figs. 7 and 8 in which the slip joint, sleeve or similar slidable connection is at H, whereas Figs. 9 and 10 are based upon an arrangement in which the slipper is at I. In Figs. 7 and 9 an additional wheel ($K_2'$) similar to ($K_2$) and coaxial therewith is provided to carry the fulcrum representing $P_2$. However the transmission between ($K_2$) and ($K_2'$) as well as gear wheel ($K_2'$) can be omitted by substituting a cranked shaft $M_2Q_2P_2$ for establishing the position of point $P_2$ (Fig. 8). In Fig. 10 a cranked shaft $M_2R_2P_2$ determines the motion of point $P_2$.

Fig. 11 is a form of construction of the gearing based upon an arrangement as shown in Fig. 4 with the slip joint, sleeve or similar slidable connection motion at M. The mechanism is very simple, but the driving mechanism for the two shafts $M_1$ and $M_2$ is not specially shown. It will be understood that the position of the two shafts $M_1$ and $M_2$ as well as the position of M are fixed in space. As illustrated by Fig. 12 $MM_2$ may be supported in bearings above wheel (R). $P_2$ is rigidly connected with (R). (R) is driven through a lateral gear wheel.

An embodiment of the gearing according to Fig. 4 with the slip joint, sleeve or similar slidable connection motion at I is illustrated in Fig. 13. $NM_2$ may run in bearings above (R). The wheel which carries the two points $P_2$ and $R_2$ is driven from a lateral gear wheel.

*Summary*

Non-locking continuous motion of the mechanism will be secured if the elements of the kinematic chain as listed hereunder are arranged in planes $a$, $b_1$, $b_2$, $c$, $d$, $e$ all of which are parallel with the rolling circles in the sequence in which they appear when the table is read from top to bottom.

Parallelogram arm $M_2N$ (Figs. 3, 9, 10; 4, 13) in $a$
Two similar parallelogram arms $M_1H$ (Figs. 3, 7, 8) or NI (Figs. 3, 9, 10; 4, 13) in $b_1$
and $M_2Q_2$ (Figs. 3, 7, 8) and $M_2R_2$ (Figs. 3, 9, 10; 4, 13) in $b_2$
Parallelogram arm $Q_2H$ (Figs. 3, 7, 8) or $R_2I$ (Figs. 3, 9, 10; 4, 13) in $c$
Guide arm $M_2P_2$ (Figs. 3, 7) or $M_2P_2$ (Figs. 3, 9; 4, 13) or $Q_2P_2$ (Figs. 3, 8) or $R_2M_2P_2$ (Figs. 3, 10) in $d$
Normal $n$ with generating point $P_2$ (Figs. 3, 7, 8) or guide point I (Figs. 3, 9, 10; 4, 13) in $e$ In Figs. 7, 8, 9 and 10 the two planes $b_1$ and $b_2$ may coincide.

(5) *Machining the inside rotor.*—The trochoid representing the outer rotor revolves about the fixed fulcrum $M_1$ (cf. Fig. 4) whereas the inner rotor may be assumed to revolve at the appropriate speed about the likewise fixed fulcrum $M_2$. The flanks of the trochoids or their parallel curves and of the sectional contour of the associated inner rotor must then cooperate when ($K_2$) rolls on ($K_1$).

If the trochoid in Fig. 4 is assumed for the moment to be rigidly connected with ($K_1$), and ($K_1$) is allowed to roll on ($K_2$), then the consecutive positions of the trochoid must define an envelope around the cross sectional contour of the inner rotor. The term "enveloping" means that in every position of the trochoid the latter will abut the inner rotor and thus have a common normal with the latter at the point of contact between them.

If it is further assumed that the trochoid has been generated according to Fig. 4 (cutting tool F) then the individual enveloping positions will be produced if the blank is so moved that a circle ($K_2'$) which is rigidly connected therewith, and which is both coaxial and congruent with ($K_2$), rolls on a fixed circle ($K_1'$) which is coaxial and congruent with ($K_1$). In every position of the blank several points and their tangential elements will then be machined on to the blank.

It is, of course not necessary that the entire trochoid associated with each position of the blank should be machined. By gradually moving the blank the latter can be presented to the tool in such a way that the momentarily osculating elements of the trochoid are machined.

(6) *Kinematic inversion.*—The relative motions that have been described may be conveniently generated by kinematic inversion. The same relative movements arise if the work axis is fixed in space and the entire mechanism revolves—for instance on the rotating work table of a machine tool. This will permit the cutting or grinding tool to be much more accurately guided.

The above described mechanism is not entirely positive, see Figs. 14a and 14b, because in an ideally accurate motion the parallelogram linkages PL and PL' could collapse in their extreme expanded positions into the antiparallelograms PLA and PLA', respectively. By inserting an intermediate link LP or LP', Figures 14c and 14d, this disadvantage can be obviated.

This difficulty can also be overcome by positively guiding one corner I of the parallelogram linkage by means of a spur wheel (cf. Figs. 3 and 4).

The principle underlying the invention is more conveniently explained by reference to the accompanying Fig. 15. Point $P_2$ of the externally toothed gear wheel ($K_2$) will generate a trochoid when ($K_2$) rolls on gear wheel ($K_1$) which is likewise provided with external gear teeth. The spur wheel ($K_2'$) is congruent with gear wheel ($K_2$) and the two wheels mesh with the teeth of the fixed wheel ($K_1$) at diametrically opposite points. Rigidly connected with ($K_2'$) is the arm N'I' the length of which is equal to $$\frac{p_2}{r}(2k+r)$$

so that, whatever the position of the two wheels ($K_2$) and ($K_2'$), $M_2P_2$ will always be parallel with N'I'. It follows from the above explanations that the above-mentioned joint I in the parallel linkage can be replaced by the point I' and that incidentally the previously required parallelogram arms $M_2R_2$ and $R_2I$ can be omitted entirely. The normal to the trochoidal curve at $P_2$ is therefore positively determined by the provision of a slip joint, sleeve or similar slidable connection motion at point I', even when the parallelogram passes through its fully expanded position. A practical embodiment of a tool guiding mechanism based on this principle is diagrammatically illustrated in Fig. 15.

Figures 16 and 16a illustrate a practical arrangement in which one circular element in the form of a stationary externally toothed gear wheel K is mounted to a suitable fixed support. Diametrically opposed externally toothed gears $K_2$ and $K_2'$ are keyed to shafts $M_2$ and $N_1$, respectively, journaled in the ends of an arm $M_3$ keyed to a shaft $M_1$ passing through the center of fixed gear K. Gear $K_2$ has a pitch of one-half that of gear K. A crank arm extends horizontally from the lower end of shaft $M_2$, and carries a vertical crank pin, the center line of which $P_2$ is the point which describes an epitrochoid, as referred to in the preceding paragraphs.

Another crank arm extends horizontally from the lower end of shaft $N_1$, and carries a vertical crank pin the axis of which is shown at $I'$. The eccentricity of the axis $I'$ of this latter crank pin relative to the axis of shaft $N_1$ is such that a line connecting the axis of the other crank pin, that is what can be termed a point $P_2$, always passes through the common point of tangency $T'$ of the pitch circles of gears $K_2$ and K. In other words, the distance between the axis of shaft $M_2$ and the axis $P_2$ of the crank pin bears the same relation to the distance between the axis of shaft $M_1$ to the point of tangency $T'$ as does the distance between the axis of shaft $N_1$ and the axis $I_1$ of the other crank pin is related to the distance between the axis of shaft $N_1$ to the common point of tangency $T'$. Also, the included angle between the common point of tangency $T'$ and the axis of shaft $M_2$ and the axis $P_2$ of the first crank pin is always equal to include the angle between the axis $I_1$ of the other crank pin, the axis of shaft $N_1$, and the common point of tangency $T'$.

As shown in Figure 16, a tool support is provided which includes a rod or link $n$, having at one end a support housing $N'$ to which the first crank pin is pivotally connected, while the rod end is slidable through a sleeve $I''$ depending from the second crank pin. Therefore, the tool support always lies along a line normal to the epitrochoid.

A grinding wheel is mounted to depend from support portion $N'$ with its axis lying along the line connecting the axis $P_2$ of the first crank pin with the axis $I'$ of the second crank pin, as clearly shown in Figure 16. If the axis of the grinding wheel is spaced inwardly from the axis $P_2$ of the first crank pin, the distance of the radius of the grinding wheel, then the wheel will generate the shape of the epitrochoid followed by the axis $P_2$ of the first crank pin, since the tangent to the grinding wheel will then be exactly aligned with the axis $P_2$ of the crank pin.

It is further believed clear that if the axis of the grinding wheel is moved in a direction toward the first crank pin, that is outwardly so that its periphery extends beyond the axis $P_2$ of the first crank pin, the curved ground on the workpiece W will be one that is parallel to the epitrochoid described by the axis $P_2$, that is, it will be a curve that is spaced from this true epitrochoid a fixed distance at all points.

It is therefore believed clear that the structural relationships shown in Figures 16 and 16a will generate and grind the desired epitrochoidal shape that is followed by the axis or generating point $P_2$, or it will equally readily generate or grind any desired curve that is parallel to the basic epitrochoid, suitable means being provided to adjust support $N'$ axially of rod $n$ to alter the position of the axis of the grinding wheel F.

It is further believed clear that a milling type cutter can be utilized in lieu of a grinding wheel.

The same principle may also be applied to a machining mechanism in which the trochoid is generated by rolling a wheel with internal teeth of a wheel on the periphery of a wheel with external teeth. In analogy with Fig. 15, Fig. 17 shows an embodiment which includes a second wheel ($K_2'$) with internal teeth that is similar in every respect to the wheel ($K_2$) but meshes with the external gear wheel ($K_1$) at a diametrically opposite point. Wheel ($K_2'$) is rigidly connected with an arm $N'I'$ the length of which is equal to $$p_2 \frac{k-p_1}{k+p_1}$$

so that $N'I'$ will always be parallel with $M_2P_2$. The normal to the trochoidal curve at point $P_2$ will therefore likewise be positively guided by the slip joint, sleeve or similar slidable connection motion located at point $I'$ even when the parallelogram is fully expanded. A corresponding practical embodiment of this mechanism is diagrammatically shown in Fig. 18. The top halves of the two internal gear wheels ($K_2$) and ($K_2'$) are not shown. Wheel shaft $M_2M_1N'$ does not move. The driving gear indicated on one side of the drawing causes the table to revolve about $M_1$ at the same speed as ($K_1$) so that a point on the projected axis through $P_2$ will trace the trochoid on the table.

In the form of construction shown in Fig. 15 the normal to the curve is guided with sufficient precision. Any desired degree of accuracy can likewise be secured for guiding the normal when the trochoid is generated by internal gear wheels. The principle of this may first be explained in relation to wheels with external gear teeth by reference to Fig. 20 which represents a mechanism similar to that shown in Fig. 15. A wheel ($K_2^*$) is coaxially secured to wheel ($K_2^*$). An intermediate gear wheel ($K_1^*$) drives a second gear wheel ($K_2'^*$) which is similar in all respects to gear wheel ($K_2^*$). In any position of the system $M_2P_2$ will be parallel with ST so that T may be used as a sleeve fulcrum for guiding the normal. An analogous arrangement for the generation of the trochoid by rolling a gear wheel with internal teeth ($K_2$) on a gear wheel ($K_1$) with external teeth is illustrated by Fig. 21. A wheel ($K_2^*$) is coaxially secured to wheel ($K_2^*$) and through an intermediate gear wheel ($K_1^*$) drives a second gear wheel ($K_2'^*$) which is similar to ($K_2^*$) in all respects. Since the location of the fulcrum S of gear wheel ($K_2'^*$) can be arbitrarily selected, any desired precision can be achieved for guiding the normal through points $P_2$ and T. A practical embodiment of this arrangement is diagrammatically shown in Fig. 22. Wheel ($K_1$) is fixed. Point $P_2$ traces the trochoid. This mechanism is positive in operation and will work continuously without locking.

Referring now to Fig. 23, 1 designates the base plate on which the workpiece 2 is clamped by means of clamping elements, not shown. A housing 4 of the machine is mounted on the base plate 1 by means of screws 3. A pin 5 mounted non-rotatably within the housing 4 by a key 6 is secured against axial displacement by a screw 7 and washer 8 and carries a toothed wheel 9 which is fixed to the pin 5 by a key 10. Toothed wheels 11 and 12 are in mesh with the toothed wheel 9 at diametrically opposed points, and their axes 13 and 14, respectively, are interconnected by plates 15, 16. These plates are by means of bushings 17, 18 rotatably mounted on pin 5 and are arranged on either side of the toothed wheel 9. A screw 19 with washer 20 secures the plates 15, 16 and the fixed toothed wheel in axial direction. The axes 13, 14 are rigidly connected with their respective toothed wheels 11 and 12 by means of keys 21, 22 and screws 23, and can freely rotate within the plates 15, 16 by means of bushings 24, 25.

A toothed wheel 27 is connected to the plate 15 by bolts 26, which toothed wheel is meshing with a toothed wheel 28 keyed to a shaft 29 which is rotatably supported within the housing 4. The free end of said shaft is provided with a square 30 onto which a crank can be put.

The axis 13 continues in a swiveling arm 31 within which a pivot 32 is supported. The pivot 32 encloses a bore through which a rod 33 is slidably guided.

The axis 14 is provided with an eccentrically arranged pivot 34 on which a bridge 35 is rotatably mounted. This bridge is connected to the rod 33 by screws 36. The rod 33 is provided with a hole 37 within which the support 38 of a tool 39, f. i. a grinding wheel, is shiftably guided. The support 38 includes a threaded hole 40 with which a threaded spindle 41 co-operates. The spindle 41 is rotatably supported at the end of the rod 33 and can be turned by a crank 42. The support 38 carries a shaft 43 which at its one end carries the tool 39 and at its other end a driving pulley 44. A belt 45 connects the pulley 44 with the prime mover 46 which can slide upon the rod 33 and which is interconnected with the spindle 41 in that way that it is shifted just so as the support 38 when the spindle is turned.

The function of this machine can be understood from Fig. 15. Thereby the pin 5 corresponds to the point $M_1$, the fixed toothed wheel 9 to the circle $K_1$, the toothed wheel 11 to the wheel $K_2'$, the toothed wheel 12 to the wheel $K_2$, the axis 13 to the point $N'$, the axis 14 to the point $M_2$, the center axis of the eccentrical pivot 34 to the point $P_2$, the center axis of the pivot 32 to the point $I_2$ and the rod 33 to the normal $n$. By movement of the rod 33 by means of the eccentrical pivot 34 and guidance of this rod by the swiveling arm 31 and the pivot 32, the contact line 47 of the tool 39 describes on the workpiece 2 an epitrochoid or an equidistant thereof when the driving shaft 29 is turned. A true epitrochoid is generated when the contact line 47 is in alignment with the center axis of the eccentrical pivot 34.

The tool 34 can be shifted along the rod 33 by the crank 42 until the desired curve form at the workpiece 2 is reached.

It is likewise possible to secure the rod 33 rigidly on a base plate not shown, and to allow the base plate 1 with workpiece 2 and housing 3 to move, in which case the tool 39 is stationary. This is advantageous with respect to the firm support of the tool.

Therefore, various possibilities are present to generate a trochoidal surface with the mechanisms shown, as follows:

(1) The axes $M_1$ and $M_2$ are stationary, the wheels $K_1$ and $K_2$ rotate, the workpiece rotates with $K_1$, the point $P_2$ plots a trochoid on the rotating workpiece.

(2) The axis $M_1$ and the wheel $K_1$ are stationary, the wheel $K_2$ rolls around the wheel $K_1$, the axis $M_2$ rotates about the axis $M_1$, the workpiece is stationary, the point $P_2$ plots a trochoid on the stationary workpiece.

(3) The normal $n$ is stationary, both wheels $K_1$ and $K_2$ and their axes $M_1$ and $M_2$ rotate and with $K_1$ likewise the workpiece. The stationary point $P_2$ describes on the workpiece which executes a trochoidal motion, a trochoid. This case is extremely important as it gives the possibility for the tool to be stationary and consequently the mounting of the tool is facilitated. This possibility is shortly described in Pages 12 and 13 of the description under "Kinematic inversion."

What we claim is:

1. Mechanism for working a cylindrical surface of a workpiece to have a cross section of generally trochoidal shape or of a shape parallel to a true trochoid comprising a first member having a cylindrical circular surface and being fixed in relation to the workpiece, at least one wheel supported in rolling contact with said circular surface, wherein the length of the radius of said wheel is to the length of the radius of the circular surface as successive whole numbers, means for rolling said wheel in contact with said circular surface, whereby any selected point rigidly connected to said wheel describes a trochoid when the axis of the wheel makes exactly one revolution about said circular surface, tool supporting means having at least a portion of its length extending in a direction that is normal to any trochoid generated by any of said selected points, a pivot means for the supporting means axially aligned with said selected point, means for constraining said pivot means to move in a circle about the axis of said wheel as the wheel rotates, means relatively slidably engaging said tool supporting means for movement along and in the plane of said normal direction, a second pivot means parallel to the first pivot means and connected to said last-mentioned means, said second pivot means being in alignment with said first pivot means along said normal direction, means for moving said second pivot means in a circular path about a point lying on a diameter that is common to said wheel and circular surface and at a rotary speed equal to the speed of rotation of said wheel, said last-mentioned means including a link being parallel to the line which connects the axis of said wheel with said selected point, whereby upon rotation of said link and wheel said tool supporting means is constrained to remain normal to the trochoid described by said first pivot means, and tool means shiftable along and adjustable with respect to the longitudinal axis of said tool supporting means in a position such that a line along the tool means parallel to said pivot means engages the workpiece and generates a cylindrical surface with the said line on the tool means following the movement of said first pivot means.

2. Mechanism for working a cylindrical surface of a workpiece to have a cross section of generally trochoidal shape or of a shape parallel to a true trochoid comprising a first member having a cylindrical circular surface and being fixed in relation to the workpiece and rotatable about a stationary axis, at least one wheel rotatable about a stationary axis in contact with said circular surface, wherein the length of the radius of said wheel is to the length of the radius of said circular surface as successive whole numbers, means for rolling said wheel in contact with said circular surface whereby any selected point rigidly connected to said wheel describes a trochoid on a plane rotating with and parallel to said circular surface when the circular surface makes exactly one revolution about its axis, tool supporting means having at least a portion of its length extending in a direction that is normal to any trochoid generated by any of said selected points, a pivot means for the supporting means axially aligned with said selected point, means for constraining said pivot means to move in a circle about the axis of said wheel as the wheel rotates, means relatively slidably engaging said tool supporting means for movement along and in the plane of said normal direction, a second pivot means parallel to the first pivot means and connected to said last-mentioned means, said second pivot means being in alignment with said first pivot means along said normal direction, means for moving said second pivot means in a circular path about a point lying on a straight line which passes through the axes of said wheel and circular surface and at a rotary speed equal to the speed of rotation of said wheel, said last-mentioned means including a link being parallel to the line which connects the axis of said wheel with said selected point whereby upon rotation of said link and wheel said tool supporting means is constrained to remain normal to the trochoid described by said first pivot means on said rotating plane, and tool means shiftable along and adjustable with respect to the longitudinal axis of said tool supporting means in a position such that a line along the tool means parallel to said pivot means engages the workpiece representing said rotating plane and generates a cylindrical surface with said line on the tool means following the movement of said first pivot means as said workpiece rotates with said circular surface.

3. Mechanism for working a cylindrical surface of a workpiece to have a cross section of generally trochoidal shape or of a shape parallel to a true trochoid comprising a first member having a cylindrical circular surface and being fixed in relation to the workpiece and rotatable about a stationary axis, at least one wheel rotatable about a stationary axis in contact with said circular surface, wherein the length of the radius of said wheel is to the length of the radius of said circular surface as successive whole numbers, means for rolling said wheel in contact with said circular surface whereby any selected point rigidly connected to said wheel describes a trochoid on a plane rotating with and parallel to said circular surface when the circular surface makes exactly one revolution about its axis, tool supporting means having at least a portion of its length extending in a direction that is normal to any trochoid generated by any of said selected points, a pivot means for the supporting means axially aligned with said selected point, means for constraining said pivot means to move in a circle about the axis of said wheel as the wheel rotates, means relatively slidably engaging said tool supporting means for movement along and in the plane of said normal direction, a stationary second pivot means parallel to the first pivot means and connected to said last mentioned means in axial alignment with the contact point of said wheel and circular surface, said second pivot means being in alignment with said first pivot means along said normal direction, whereby upon rotation of said wheel and circular surface said tool supporting means is constrained to remain normal to the trochoid described by said first pivot means on said rotating plane and tool means shiftable along and adjustable with respect to the longitudinal axis of said tool supporting means in a position such that a line along the tool means parallel to said pivot means engages the workpiece representing said rotating plane and generates a cylindrical surface with said line on the tool means following the movement of said first pivot means as said workpiece rotates with said circular surface.

4. Mechanism as claimed in claim 3 wherein said cylindrical circular surface is stationary and comprising means for rotating the axis of said wheel supported in rolling contact with said circular surface about the center of said circular surface, means non-rotatably connecting said second pivot means with the said axis of said wheel whereby on rotation of said wheel and axis said tool supporting means is constrained to remain normal to the trochoid described by said first pivot means.

5. Mechanism for working a cylindrical surface of a workpiece to have a cross section of generally trochoidal shape or of a shape parallel to a true trochoid comprising a first member having a cylindrical circular surface and being fixed in relation to the workpiece, at least one wheel supported in rolling contact with said circular surface, wherein the length of the radius of said wheel is to the length of the radius of the circular surface as successive whole numbers, means for rolling said wheel in contact with said circular surface whereby any selected point rigidly connected to said wheel describes a trochoid when the axis of the wheel makes exactly one revolution about said circular surface, tool supporting means having at least a portion of its length extending in a direction that is normal to any trochoid generated by any of said selected points, a pivot means for the supporting means axially aligned with said selected point, means for constraining said pivot means to move in a circle about the axis of said wheel as the wheel rotates, means relatively slidably engaging said tool supporting means for movement along and in the plane of said normal direction, a second pivot means parallel to the first pivot means and connected to said last-mentioned means, said second pivot means being in alignment with said first pivot means along said normal direction, means for slidably connecting said second pivot means with a point lying on a straight line which passes through the axis of said wheel and first pivot means, means for rotating said point in a circular path about said axis at a rotary speed equal to the speed of rotation of said wheel, said connection of said second pivot means with said point including a link being parallel to the line which connects the axes of said wheel and circular surface whereby upon movement of said link and wheel said tool supporting means is constrained to remain normal to the trochoid described by said first pivot means, and tool means shiftable along and adjustable with respect to the longitudinal axis of said tool supporting means in a position such that a line along the tool means parallel to said pivot means engages the workpiece and generates a cylindrical surface with the said line on the tool means following the movement of said first pivot means.

6. Mechanism for working a cylindrical surface of a workpiece to have a cross section of generally trochoidal shape or of a shape parallel to a true trochoid comprising a first rotatable member having a cylindrical surface and being fixed in relation to the workpiece, at least one wheel supported in rolling contact with said circular surface, wherein the length of the radius of the circular surface is to the length of the radius of said wheel as successive whole numbers, means for rolling said wheel in contact with said circular surface, a stationary pivot means being in alignment with a stationary point inside the circumference of said wheel, means for moving the axis of said wheel in a circle about said pivot means, whereby said stationary point is plotting a trochoid on a plane rotating with said circular surface when the axis of said wheel makes exactly one revolution about said circular surface, stationary tool supporting means having at least a portion of its length extending in a direction that is normal to a trochoid plotted by said point, means relatively slidably engaging said tool supporting means for movement along and in the plane of said normal direction, a second pivot means parallel to said first pivot means and connected to said last-mentioned means along said normal direction, means for moving a point lying on a diameter that is common to said wheel and circular surface in a circular path about said second pivot means and at a rotary speed equal to the speed of rotation of said wheel, said last-mentioned means including a link being parallel to the line which connects the axis of said wheel with said stationary point whereby upon rotation of said link and wheel said circular surface and the workpiece being fixed in relation to the circular surface are constrained to make movements in their planes on which the said stationary point plots a trochoid, and tool means shiftable along and adjustable with respect to the longitudinal axis of said tool supporting means in a position such that a line along the tool means parallel to said pivot means engage the workpiece and generates a cylindrical surface with said line on the tool means.

7. Mechanism for working a cylindrical surface of a workpiece to have a cross section of generally trochoidal shape or of a shape parallel to a true trochoid comprising a first member having a cylindrical circular surface and being fixed in relation to the workpiece, one wheel supported in rolling contact with said circular surface, a second wheel being supported in rolling contact with said first wheel and having a radius the length of which is to the length of the radius of the circular surface as successive whole numbers, means for connecting the axes of both said wheels, said means being rotatable about the center of said circular surface whereby any selected point rigidly connected to said second wheel describes a trochoid when the axis of the said second wheel makes exactly one revolution about said circular surface, tool supporting means having at least a portion of its length extending in a direction that is normal to any trochoid generated by any of said selected points, a pivot means for the supporting means axially aligned with said selected point, means for constraining said pivot means to move in a circle about the axis of said second wheel as the wheel rotates, means relatively slidably engaging said tool supporting means for movement along and in the plane of said normal direction, a second pivot means parallel to the first pivot means and connected to said last-mentioned means, said second pivot means being in alignment with said first pivot means along said normal direction, means for moving said second pivot means in a circular path about a point lying on a diameter that is common to said second wheel and circular surface and at a rotary speed equal to the speed of rotation of said second wheel, said last-mentioned means including a link being parallel to the line connecting the axis of said second wheel with said selected point whereby upon rotation of said link and second wheel said tool supporting means is constrained to remain normal to the trochoid described by said first pivot means, and tool means shiftable along and adjustable with respect to the longitudinal axis of said tool supporting means in a position such that a line along the tool means parallel to said pivot means engages the workpiece and generates a cylindrical surface with the said line on the tool means following the movement of said first pivot means.

8. Mechanism for working a cylindrical surface of a workpiece to have a cross section of generally trochoidal shape or of a shape parallel to a true trochoid comprising a first member having a cylindrical circular surface and being fixed in relation to the workpiece, at least one first wheel supported in rolling contact with that circular surface, wherein the length of the radius of said wheel is to the length of the radius of the circular surface as successive whole numbers, means for rolling said wheel in contact with said circular surface whereby any selected point inside the circumference of said wheel describes a trochoid when the axis of the wheel makes exactly one revolution about said circular surface, a second wheel arranged coaxially to said first wheel and of the same radius and being driven by said first wheel by means of an intermediate wheel which is in contact with both said wheels, tool supporting means having at least a portion of its length extending in a direction that is normal to any trochoid generated by any of said selected points, a pivot means for the supporting means axially aligned with said selected point, means for constraining said pivot means to move in a circle about the axis of said wheels as the wheels rotate, means relatively slidably engaging said tool supporting means for movement along and in the plane of said normal direction, a second pivot means parallel to the first pivot means and connected to said last-mentioned means, said second pivot means being in alignment with said first pivot means along said normal direction, means for moving said second pivot means in a circular path about a point lying on a diameter that is common to said wheels and circular surface and at a rotary speed equal to the speed of rotation of said wheels, said last-mentioned means including a link being parallel to the line connecting the axis of said wheels with said selected point whereby upon rotation of said link and wheels said tool supporting means is constrained to remain normal to the trochoid described by said first pivot means, and tool means shiftable along and adjustable with respect to the longitudinal axis of said tool supporting means in a position such that a line along the tool means parallel to said pivot means engages the workpiece and generates a cylindrical surface with the said line on the tool means following the movement of said first pivot means.

9. Mechanism for working a cylindrical surface of a working piece to have a cross section of generally trochoidal shape or of a shape parallel to a true trochoid comprising a first member having a cylindrical surface and being fixed in relation to the workpiece, two wheels of equal radius supported in rolling contact with said circular surface on diametrically opposed points, at which the length of said radius is to the length of the radius of said circular surface as successive whole numbers, means for rolling said wheels in contact with said circular surface whereby any selected point inside the circumference of one of said wheels describes a trochoid when the axis of this wheel makes exactly one revolution about said circular surface, tool supporting means having at least a portion of its length extending in a direction that is normal to any trochoid generated by any of said selected points, a pivot means for the supporting means axially aligned with said selected point and rigidly connected with the one of both said wheels thereby moving in a circle about the axis of said wheel as the wheel rotates, means relatively slidably engaging said tool supporting means for movement along and in the plane of said normal direction, a second pivot means parallel to the first pivot means, and connected to said last-mentioned means, said second pivot means being in alignment with said first pivot means along said normal direction, a link connected concentrically to the other of both said wheels thereby rotating about the axis of said wheel as that wheel rotates, said link supporting said second pivot means and being parallel to the line connecting the axis of said first wheel with said selected point whereby upon rotation of said link and wheels said tool supporting means is constrained to remain normal to the trochoid described by said first pivot means, and tool means shiftable along and adjustable with respect to the longitudinal axis of said tool supporting means in a position such that a line along the tool means parallel to said pivot means engages the workpiece and generates a cylindrical surface with the said line on the tool means following the movement of said first pivot means.

10. Mechanism for working a cylindrical surface of a workpiece to have a cross section of generally trochoid shape or of a shape parallel to a true trochoid comprising a first member having a cylindrical circular surface and being fixed in relation to the workpiece and rotatable about a stationary axis, two wheels of equal radius supported in rolling contact with said circular surface on diametrically opposed points and rotating about stationary axes at which the length of said radius is to the length of the radius of said circular surface as successive whole numbers, means for rolling said wheels in contact with said circular surface whereby any selected point rigidly connected to one of said wheels describes a trochoid on a plane parallel to and rotating with said circular surface when said circular surface makes exactly one revolution about its axis, tool supporting means having at least a portion of its length extending in a direction that is normal to any trochoid generated by any of said selected points, a pivot means for the supporting means axially aligned with said selected point and rigidly connected with one of said wheels, thereby moving in a circle about the axis of said wheel as the wheel rotates, means relatively slidably engaging said tool supporting means for movement along and in the plane of said normal direction, a second pivot means parallel to the first pivot means and connected to said last-mentioned means, said second pivot means being in alignment with said first pivot means along said normal direction and being eccentrically connected to the other of said wheels thereby moving in a circular path about the axis of said other wheel as this wheel rotates, the direction of eccentricity being parallel to the line connecting the axis of said first wheel with said selected point, whereby upon rotation of said wheels and circular surface said tool supporting means is constrained to remain normal to the trochoid described by said first pivot means on said plane, and tool means shiftable along and adjustable with respect to the longitudinal axis of said tool supporting means in a position such that a line along the tool means parallel to said pivot means engages the workpiece representing said plane and generates a cylindrical surface with the said line on the tool means following the movement of said first pivot means as the workpiece rotates with the said circular surface.

11. Mechanism as claimed in claim 1, wherein the means for moving said second pivot means about a point lying on a diameter that is common to said wheel and circular surface consists of a link rigidly connected to a wheel the center of which lying on said diameter, which wheel is in rolling contact with a second wheel with its center on said diameter, said last-mentioned wheel being driven by a further wheel which is connected to said wheel being in rolling contact with said circular surface and being of the same radius as the first-mentioned wheel, whereby on rotation of said wheel in contact with said circular surface, said first-mentioned wheel and link rotates with the same rotary speed.

12. Mechanism for generating a generally trochoidal surface on a workpiece comprising a first member having a circular surface and an axis fixed in relation to the workpiece, at least one wheel supported in rolling contact with said circular surface, said wheel and surface having radii of lengths bearing a relationship of successive whole numbers, means for rolling said wheel in contact with said circular surface whereby any selected point rigidly connected to said wheel describes a trochoid when the axis of the wheel makes exactly one revolution about said circular surface, tool supporting means having at least a portion of its length extending in a direction that is normal to any trochoid generated by any of said selected points, a pivot means for supporting means axially aligned with said selected point, means for constraining said pivot means to move in a circle about the axis of said wheel as the wheel rotates, means relatively slidably engaging said tool supporting means for movement along and in the plane of said normal direction, a second pivot means parallel to the first pivot means and connected to said last-mentioned means, said second pivot means being in alignment with said first pivot means along said normal direction, means for moving said second pivot means in a circular path about a point lying on a diameter that is common to said wheel and circular surface and at a rotary speed equal to the speed of rotation of said wheel, said last-mentioned means including a link having a length complementary to the eccentricity of said first pivot means with respect to said wheel and parallel to a line connecting the axis of said wheel with said selected point whereby upon rotation of said link and wheel said tool supporting means is constrained to remain normal to the trochoid described by said first pivot means, and tool means carried by said tool supporting means in a position such that a line along the tool means parallel to said first pivot means engages the workpiece and generates a surface with the said line on the tool means following the movement of said first pivot means.

13. A device for grinding a surface of a machine element to have the profile of generally trochoidal shape comprising a fixed gear the axis of which establishes the axis of the device, an arm mounted for rotation on said axis of the device, a first rotatable gear mounted on said arm to operate with respect to said fixed gear, a first crank pin mounted for rotation with and perpendicular to said first rotatable gear, a second rotatable gear mounted on said arm diametrically opposite said first rotatable gear, a second crank pin mounted for rotation with and perpendicular to said second rotatable gear, a sleeve pivotally mounted on said second crank pin, a straight grinding tool-holding and guiding bar means pivoted near one end to said first crank pin and slidably received in said sleeve and a grinding tool including a grinding wheel carried by said grinding tool-holding and guiding bar means in a position such that the axis of said grinding wheel lies on the line including the axes of said first and second crank pins, and a tangent to said grinding wheel is normal to said line including the axes of said first and second crank pins at a point at least adjacent the axis of said first crank pin.

14. Mechanism for generating either internal or external trochoidal surfaces or surfaces parallel to a true trochoid and including a pair of circular elements one of which is in rolling contact with the other, a generating tool means having its working surface disposed in a line constituting the normal to the track of a true trochoidal curve, a link rod constrained to be fulcrumed at the generating point of the trochoidal surface, means extending perpendicular to said circular elements and disposed in a plane that is spaced axially from said circular elements and defining a second point for determining the position of said link rod to be in coincidence with the normal of the trochoidal surface to be generated and said means including a parallel linkage mechanism and a slidable connection between said link rod at said second point.

15. Mechanism as claimed in claim 14 in which both said circular elements are meshing externally toothed gears.

16. Mechanism as claimed in claim 14 in which both said circular elements are toothed gears, one of which has internal teeth while the other has external teeth in mesh therewith.

References Cited in the file of this patent

UNITED STATES PATENTS

| | | |
|---|---|---|
| 2,606,403 | Musyl | Aug. 12, 1952 |

FOREIGN PATENTS

| | | |
|---|---|---|
| 162,654 | Austria | Mar. 25, 1949 |
| 166,021 | Austria | May 25, 1950 |
| 645,829 | Great Britain | Nov. 8, 1950 |